May 19, 1942.  E. G. GAGE  2,283,727
METHOD AND MEANS FOR SAFELY SERVICING THERMIONIC APPARATUS
Filed June 4, 1941  3 Sheets-Sheet 1

INVENTOR.
EDWARD G. GAGE
BY
ATTORNEY.

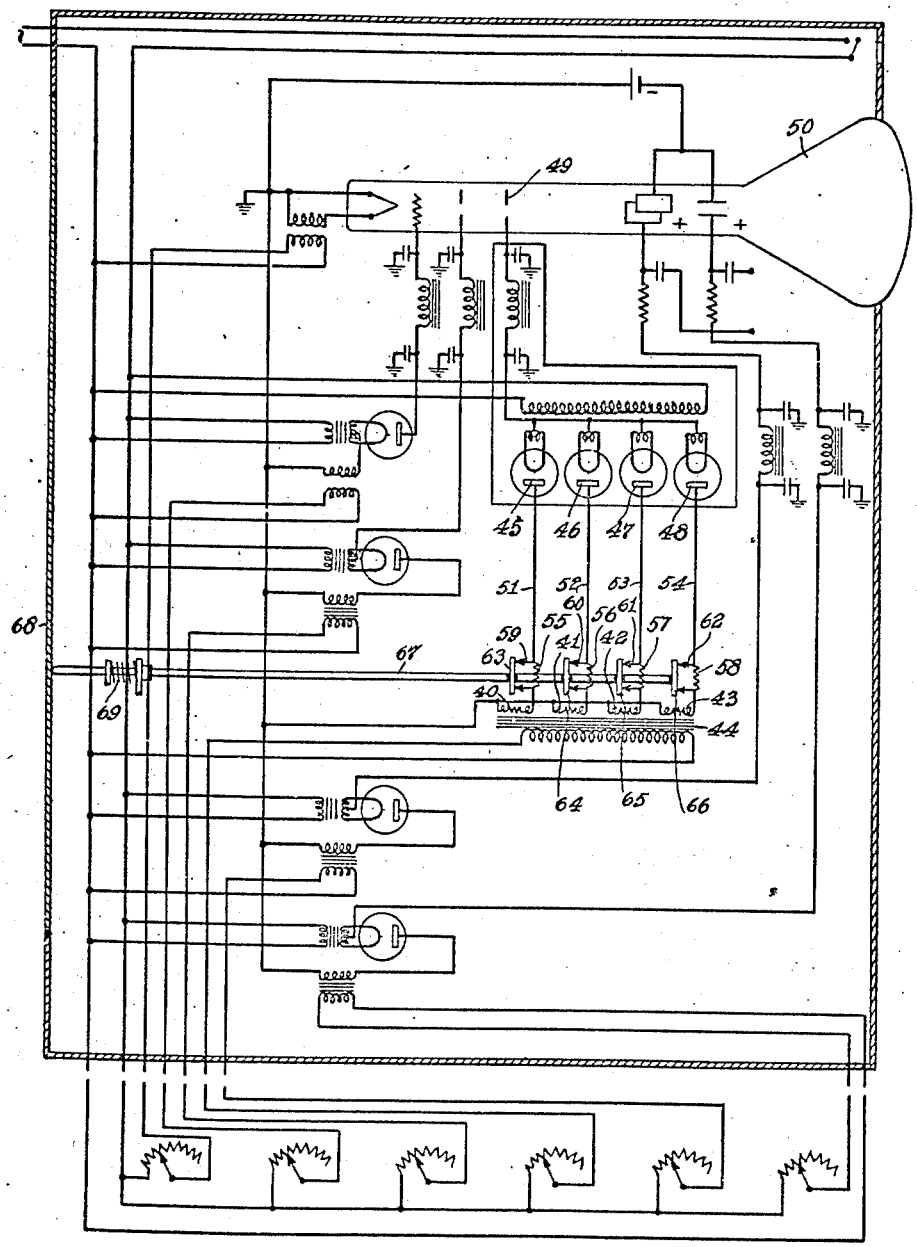

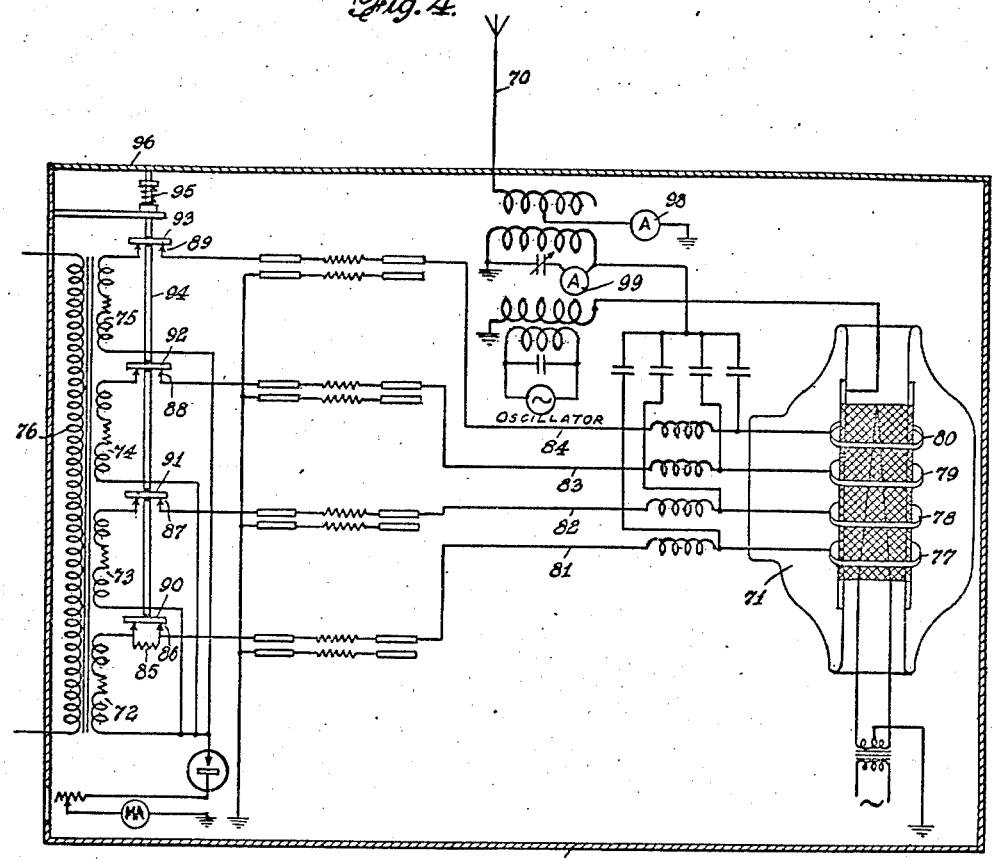
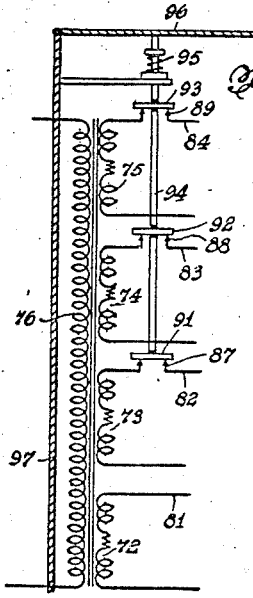
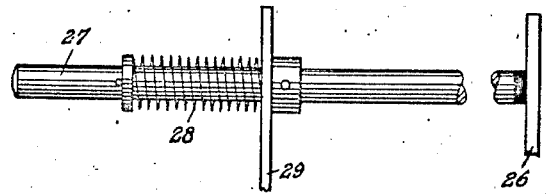

Patented May 19, 1942

2,283,727

UNITED STATES PATENT OFFICE 2,283,727

METHOD AND MEANS FOR SAFELY SERVICING THERMIONIC APPARATUS

Edward G. Gage, Brooklyn, N. Y., assignor of two-thirds to Leon Ottinger, New York, N. Y.

Application June 4, 1941, Serial No. 396,546

14 Claims. (Cl. 250—27)

The invention relates to the operation of thermionic apparatus requiring dangerously high potentials such, for example, as television and other cathode ray tube apparatus, as well as radio transmission and receiving apparatus, etc.; and relates especially to apparatus of this nature which has been safeguarded against dangerous current in the manner more especially set forth in my copending applications for U. S. Letters Patent Serial Nos. 292,993, filed September 1, 1939 (now U. S. Letters Patent 2,254,214), 330,636, filed April 20, 1940, 337,806, filed May 29, 1940, and 356,460, filed September 12, 1940. Such safeguarding is effected generally by including a high resistance between the source of dangerous voltage and the device to be operated, the resistance being located so close to said source that all parts of the circuit likely to be contacted by the human body lie beyond the said resistance. The included resistance, moreover, is of such magnitude that upon contact of the body with any exposed part of the circuit the voltage falls to a harmless value.

I have found that it is advantageous in such circuits to provide for a slight excess of current in the dangerous voltage supply to, for example, the second anode of a cathode ray television tube to permit accurate focussing. This focussing may be considered similar to the tuning of an ordinary radio apparatus in that it is desirable to exceed the optimum tuning value and then return to it to make sure that the correct or optimum point is located. In radio tuning apparatus, it is the condenser capacity value that is usually varied while in a television apparatus it is the relationship between the voltages of the first and second anodes of the cathode ray tube which is varied, as is well understood.

Where such high-potential apparatus has been duly safeguarded, as hereinbefore noted, this increase in current, if the circuit is contacted during servicing, sometimes causes a disagreeable burning sensation and slight skin burns may result at the point of contact. It is understood, of course, that in all cases the current is safe to handle but that considerable discomfort may be experienced in some instances.

It is an object of the present invention to eliminate such possible uncomfortable effects in the servicing of apparatus arranged to provide said excess current.

Another object of the invention is to permit preliminary adjustments and focussing of television apparatus, under servicing conditions, with current on and safe to handle, yet sufficient for adjustment purposes.

Still another object of the invention is to permit preliminary adjustments and tuning of radio apparatus, both transmitters and receivers, to be effected with the current on and safe to handle, yet sufficient for adjustment purposes.

Other and ancillary objects will hereinafter appear.

In carrying out the invention the particular operating circuits are safeguarded in the manner set forth in my aforesaid pending applications, provision being made for an excess of current in a circuit to permit of correct focussing or other adjustment, as hereinbefore set forth.

To accomplish this result and at the same time prevent an operator servicing the apparatus experiencing the possible disagreeable effects of this excess current, provision is made for housing or completely enclosing the entire apparatus in a protective casing. Where this is of the usual wood-type cabinet, the metal chassis preferably used to mount the apparatus is grounded, while in the case of a metal housing member the member itself is grounded. In both instances, access to the interior of the housing member is through a movable or hinged closure member or removable panel, the entire apparatus, if desired, being mounted on a removable chassis as is customary. This panel, when closed, is arranged to operate a switch or switches for the control of a resistor or resistors and/or the interruption of a circuit itself in instances where the multi-circuit arrangement for safeguarding is employed. This control is for the purpose of rendering, during the servicing operation, the current values of a more comfortable magnitude in case of contact therewith.

I am aware that it is not new to provide interlocking switches, in radio apparatus operating under dangerous voltages, for protection against accidental contact. These switches, however, merely interrupt the current on the opening of the panel or removable closure member and defeat thereby the object for which they were intended in that they do not allow of tests and adjustment with the current on. The dangerous expedient of installing temporarily a "jumper" of wire is therefore generally resorted to. This, of course, renders the apparatus again highly dangerous and a servicing operator conducts the servicing at the risk of his life.

In accordance with the present invention, an already-safeguarded circuit, though affording currents which might be uncomfortable, is combined with means to render the same for the servicing period quite comfortable to handle, yet affording sufficient power to effect the desired adjustment and tests.

In television apparatus there are commonly two sources of dangerous voltage, i. e. the secondary of the transformer which supplies the high voltage, and the filter condenser which is at the potential of the peak voltage of the transformer. In radio apparatus the same sources are present, but in high-power radio transmission apparatus both transformer and filter condenser are sources of dangerous voltage and current much greater than an ordinary television or radio receiver apparatus. With these higher current devices, a multiple-circuit form for safeguarding is utilized, and the switches operated by the closure panel or cover of the housing member then cooperate with all or only some of the individual circuits. When the closure member is returned to seal the cabinet or casing of the apparatus, the full current will then be restored.

For example, I have found that in low-power television apparatus a current value of approximately one-eighth of that required for maximum focussing and safety is sufficient to produce a picture with fair definition and brilliance, and at the same time allow handling without discomfort or objectionable jolts or burns. Currents below 1.5 milliamperes give very slight burning sensation or discomfort. This applies likewise in the operation of highpower television apparatus wherein a modified form of safety circuit arrangement is utilized.

In radio transmitters, the current reduction from maximum operating conditions with cover closed to "pilot" operating conditions with the cover open, that is, with just sufficient power to read meters, etc., is less. This is because the inherent features of transmitting tubes require heavier currents than do television tubes, hence the "pilot" operations require more current. The general rule is therefore to allow just as small currents in anode circuits as will allow "pilot" operation, and just as large as can be handled without discomfort. These conditions may be met by proper selection of meters that will register very small currents accurately, and also maximum operating currents.

The nature of the invention, however, will best be understood when described in connection with the accompanying drawings, in which:

Fig. 3 is a further more or less diagrammatic view illustrating the novel combination in connection with the safeguarding of thermionic asymmetric devices utilizing larger currents.

Fig. 4 is a similar view illustrating a modification in the current-reducing arrangement; and Fig. 5 is a still further modification thereof.

Fig. 6 is a fragmentary front elevation of a circuit modifying means utilized in the novel combination.

Figure 1:
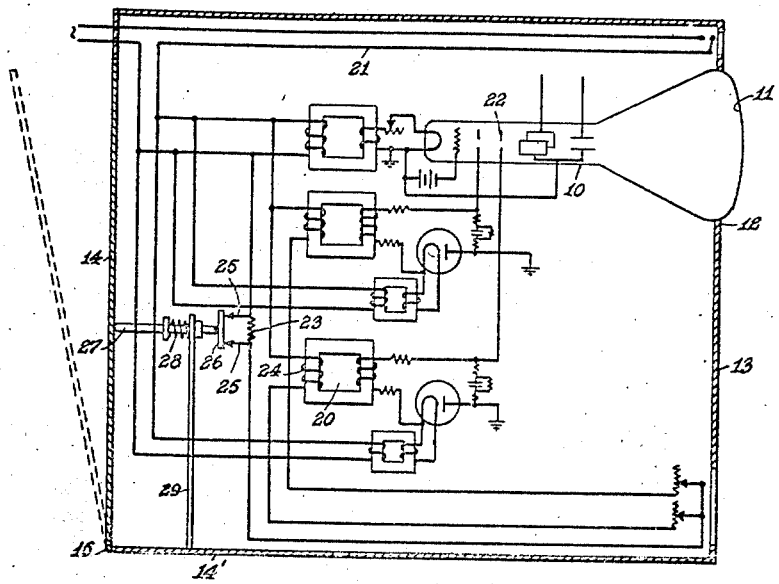
Fig. 1 is a more or less diagrammatic view illustrating the novel combination of a safeguarded, high-potential-operated, thermionic asymmetric device with means for reducing automatically the optimum current to a subnormal operative value when it is desired to service the apparatus.

Referring to the drawings, more particularly Fig. 1 thereof, there is disclosed the circuit connections for operating a cathode ray tube 10 having the screen 11 which is located at the opening 12 of a casing or cabinet 13 for housing the entire net-work and tube so that access may not be had directly thereto. In order to secure such access, one of the walls, as the back 14 of the casing, is made movable or removable, for example, by hinging the same at the bottom as at 15. The purpose of thus enclosing apparatus of this nature is to prevent bodily contact with portions of the circuit operating at dangerous voltages and currents.

In my said copending applications Serial Nos. 292,993, 330,636, 337,806, and 356,460, I have indicated various expedients for rendering such circuits safe so that the same may be handled without danger in case of repairs or replacements or performing other necessary operations thereon.

In the present embodiment, these features are retained but provision is made for reducing the current below the optimum safe value to a temporarily sub-normal operative value sufficient, to afford, for example, a "pilot" indication, but more comfortable in case of bodily contact than is the case when the full optimum value of current is flowing. Thus, as indicated, current from the source of supply or transformer 20 connected to the main 21 is arranged to be automatically decreased but only to such an extent that its flow to the anode 22 of the cathode ray tube 10 will still be of a sufficient magnitude to afford a working or pilot indication on screen 11. This may conveniently be effected by providing the series resistor 23 in the primary winding 24 of the transformer 20 and arranging the same to be short-circuited or eliminated through suitable switching means controlled by the movable back 14.

To this end, contacts 25 from the resistor 23 are designed to be bridged by a contact piece 26 at one end of a rod 27 urged outwardly by a spring 28 to engage the movable back 14. Rod 27 is supported by a bracket 29 extending upwardly from the bottom 14' of the casing and is insulated from the contact piece. By this arrangement, when back 14 is swung outwardly, as indicated in the broken-line position, or removed, the rod 27 with contact piece 26 follows the same outwardly under the action of spring 28 and opens the short-circuiting connection across resistor 23. This places the latter in series with the primary winding 24 of transformer 20 to reduce the current in the secondary or anode circuit therefrom to a sub-normal though operative value which is sufficient to effect on the screen 11 a pilot indication sufficient for the servicing of the apparatus. This reduced current makes such servicing more comfortable should there be occasional bodily contact with exposed portions of the circuit, the optimum and normal current flow to the anode being of such a value as to be more or less uncomfortable, though not dangerous, in case of bodily contact therewith. Thus, the apparatus may require 8 milliamperes in the transformer secondary on short circuit, while a current of 1 milliampere will be sufficient to produce a fair picture.

Upon completing the servicing of the device or other operations thereon, back 14 is returned to its normal location, indicated by the full lines, to close the housing; and the apparatus is then in condition for normal operation since rod 27 moves inwardly to bring the contact piece 26 across contacts 25 to eliminate thereby the effect of the resistor 23 and thus restore the optimum current flow.

Figure 2:
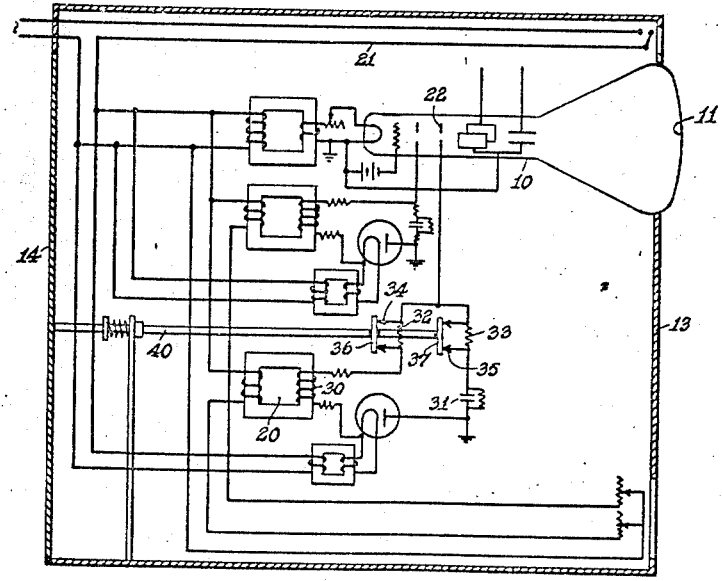
Fig. 2 is a similar view illustrating a modification.

Such resistors should, however, preferably be located in series with the secondary 30 of transformer 20, as indicated in Fig. 2 of the drawings, in which case provision is made also for introducing a series resistor in the circuit of filter condenser 31 of the anode circuit—both resistors being located as closely as possible to their respective units. Thus, a resistor 32 is included in series in one branch of the circuit from secondary 30 and a resistor 33 in the other branch of the circuit from said secondary including the filter condenser 31, and immediately beyond the latter. The reason for preference of the secondary circuit resistors is due to the fact that a primary resistor decreases the open circuit voltage of the secondary winding to a much greater extent than does a resistor in the secondary winding.

Across the respective resistors 32 and 33 are short-circuiting contacts 34 and 35 designed to be bridged by contact pieces 36 and 37, respectively. These are fixed on a rod 40 extending backwardly for engagement with the back wall or panel 14 and are reciprocable with said rod as back 14 moves. When the contacts are opened thereby, the respective resistances 32 and 33 will be introduced into the anode connection to reduce a current flowing therein to a sub-normal value as in the previously-described embodiment.

This expedient for securing temporarily a subnormal current value for the anodic circuit is applicable also to the form of multiple anodic circuits individually safeguarded but whose combined value of current flow is dangerous. For example, there may be required a current of 8 milliamperes in each of the parallel paths, making a total of 32 milliamperes on short circuit in the case of four paths, and a current of but 1 milliampere in each path may be used for "pilot" operation.

It will be seen that the reason for the apparent change in ratio between low and high power television operation is due to the fact that in the high power apparatus the circuits do not recombine upon accidental bodily contact with one path, but do combine to operate the apparatus at full power.

Reference being had to Fig. 3 of the drawings, there is indicated a plurality of independent sources of dangerously high potential as the secondaries 40, 41, 42, 43 of transformer 44, which secondaries are connected to the respective anodes of rectifiers 45, 46, 47, and 48 in the manner more particularly set forth in my copending application Serial No. 356,460, for energizing the anode 49 of the cathode ray tube 50. In each of the connections 51, 52, 53, and 54 between the secondaries and anodes there is inserted in series resistors 55, 56, 57, and 58, respectively. These are provided with respective short-circuiting contacts 59, 60, 61, and 62 and cooperating bridging contact pieces 63, 64, 65, and 66. The latter are fixed on a rod 67 cooperating with the movable back panel or closure member 68 under the action of a spring 69 to move the rod 67 as in the previously described embodiments. When rod 67 moves outwardly, resistors 55—58, inclusive, will be included in the connections 51—54, inclusive, to diminish the currents flowing therein. The said resistors will be short-circuited and therefore without effect on the respective anodic currents, when the back or closure member 68 is returned to position to seal the casing.

A further means of reducing the currents flowing in multiple anodic circuits is indicated in Fig. 4 of the drawings. In this embodiment, a substantial and dangerous total current is utilized for transmitting electromagnetic oscillations, as through the antenna 70 from the asymmetric device or thermionic radio-frequency amplifier tube 71. The tube is energized from a plurality of individual and independent secondaries 72, 73, 74, and 75 of transformer 76, which are connected respectively to the anodes 77, 78, 79, and 80 of said tube and from these transient amplified currents flow to the antenna 70, as is more particularly set forth in my copending application Serial No. 337,806. The respective anodic connections 81, 82, 83, and 84 are arranged in this instance in a manner such that one only may include a resistor while the others are arranged for complete interruption. As indicated, the connection 81 is provided with a resistor 85 in series and having short-circuiting contact 86, while the connections 82, 83, and 84 are open and provided with contacts 87, 88, and 89, respectively. These contacts as well as the contact 86 are normally bridged by contact pieces 91, 92, 93, and 90, respectively, thereby providing the optimum value of current to the antenna 70. Similarly to the previous embodiment, the various contact pieces are fixedly mounted on a rod 94 reciprocable under the action of a spring 95 and having its upper end arranged for contact with the movable top or lid 96 of the cabinet or casing 97 housing the apparatus. So long as the lid 96 remains in the closed position, resistor 86 will be short-circuited and of no effect and the connections 82, 83, and 84 uninterrupted between their respective secondaries and anodes.

When the lid 96 is elevated or removed, the three anodic connections 82, 83, and 84 are interrupted and the current in connection 81 is reduced through the introduction of resistor 85 into this circuit. The current flow remaining is, however, of sufficient magnitude to energize the antenna 70 for test or service purposes, and as may be indicated on instruments 98 and 99 included in the antenna circuit and tank circuits.

Or, as indicated, in Fig. 5 of the drawings, a resistor 85 may be eliminated entirely and the connection 81 remains permanent while the other connections 82, 83, and 84 are designed to be temporarily opened as in the embodiment indicated in Fig. 4.

By thus disconnecting all but one parallel path to a radio transmitting tube, the current in each path may be limited to 8 milliamperes, making a maximum operating current of 32 milliamperes and a minimum or "pilot" operating current of 8 milliamperes.

It will readily be seen that this last system of pilot operation is not as effective in reducing discomfort as the alternative system of parallel operation just described because in one system if a single parallel path is contacted, a current of only 1 milliampere is received; while in the last-mentioned system a current of 8 milliamperes is received. However, owing to its simplicity, this parallel system may be used in radio transmitters which require less handling. When it is imperative, however, that the anodic current or currents be inherently dangerous, that is to say, in excess of 8–10 milliamperes, the normally short-circuited resistance to be introduced is then of a magnitude sufficient not only to provide a safe value of current but also one having the desired sub-normal operative value.

I claim:

1. The combination with an electrical circuit having a source of dangerously high potential, a thermionic asymmetric device operating at a dangerously high potential and optimum anode current, conductors between the source of high potential and the said device affording a permanently continuous connection therebetween, and resistance permanently located in series with the source of dangerously high potential such that all exposed parts of the circuit lie between the resistance and said device, said resistance being of such high magnitude that upon establishment of a closed circuit through said exposed parts and the human body the current in such closed circuit is reduced by said resistance to a safe value; of a casing enclosing said source, asymmetric device, resistance, and conductors, the casing including a movable closure member therefor, means to decrease the magnitude of the anode current flow to the asymmetric device to a sub-normal operative value, and means cooperating with said closure member to render said current-decreasing means ineffective when the closure member is applied to the casing to close the same and to restore thereby the optimum current flow.

2. The combination with an electrical circuit having a source of dangerously high potential, a thermionic asymmetric device operating at a dangerously high potential and optimum anode current, conductors between the source of high potential and the said device affording a permanently continuous connection therebetween, and resistance permanently located in series with the source of dangerously high potential such that all exposed parts of the circuit lie between the resistance and said device, said resistance being of such high magnitude that upon establishment of a closed circuit through said exposed parts and the human body the current in such closed circuit is reduced by said resistance to a safe value; of a casing enclosing said source, asymmetric device, resistance, and conductors, the casing including a movable closure member therefor, a resistor included in series with the source of dangerously high potential to reduce the magnitude of the anode current flow to the asymmetrical device to a sub-normal operative value, and means actuated by said movable closure member when the latter is applied to the casing to close the same for eliminating the effect of said resistor and restore thereby the optimum current flow.

3. The combination with an electrical circuit having a source of dangerously high potential, a thermionic asymmetric device operating at a dangerously high potential and optimum anode current, conductors between the source of high potential and the said device affording a permanently continuous connection therebetween, and resistance permanently located in series with the source of dangerously high potential such that all exposed parts of the circuit lie between the resistance and said device, said resistance being of such high magnitude that upon establishment of a closed circuit through said exposed parts and the human body the current in such closed circuit is reduced by said resistance to a safe value; of a casing enclosing said source, asymmetric device, resistance, and conductors, the casing including a movable closure member therefor, a resistor included in series with the source of dangerously high potential to reduce the magnitude of the anode current flow to the asymmetric device to a sub-normal operative value, and means located in close proximity to the resistor and including extended actuting means for controlling the same, adapted for engagement with the movable closure member when the latter is applied to the casing to close the same and actuated by said member for eliminating the effect of said resistor and restore thereby the optimum current flow.

4. The combination with an electrical circuit having a source of dangerously high potential, a thermionic asymmetric device operating at a dangerously high potential and optimum anode current, conductors between the source of high potential and the said device affording a permanently continuous connection therebetween, and resistance permanently located in series with the source of dangerously high potential such that all exposed parts of the circuit lie between the resistance and said device, said resistance being of such high magnitude that upon establishment of a closed circuit through said exposed parts and the human body the current in such closed circuit is reduced by said resistance to a safe value; of a casing enclosing said source, asymmetric device, resistance, and conductors, the casing including a movable closure member therefor, a resistor included in series with the source of dangerously high potential to reduce the magnitude of the anode current flow to the asymmetric device to a sub-normal operative value, and an electric switch connected to said resistor to short-circuit the same in one position of the switch, said switch including an extended actuating means for controlling the same and adapted for engagement with the movable closure member when the latter is applied to the casing to close the same, thereby moving said switch to the position for short-circuiting the said resistor.

5. The combination with an electrical circuit having a source of dangerously high potential including a transformer with primary and secondary windings, a thermionic asymmetric device operating at a dangerously high potential and optimum anode current, conductors between the secondary of said transformer and the device affording a permanently continuous connection therebetween, and resistance permanently located in series with the secondary of said transformer such that all exposed parts of the circuit lie between the resistance and said device, said resistance being of such high magnitude that upon establishment of a closed circuit through said exposed parts and the human body the current in such closed circuit is reduced by said resistance to a safe value; of a casing enclosing said source, asymmetric device, resistance, and conductors, the casing including a movable closure member therefor, a resistor included in series with the primary of said transformer to reduce the magnitude of the normal current in said conductors, and means actuated by said movable closure member when the latter is applied to the casing to close the same for eliminating the effects of said resistor and restore thereby the optimum current flow.

6. The combination with an electrical circuit having a source of dangerously high potential including a transformer with primary and secondary windings, a cathode ray device operating at a dangerously high potential and optimum anode current, conductors between the secondary of said transformer and the anode of the cathode ray device affording a permanently continuous connection therebetween, and resistance permanently located in series with the secondary of said transformer such that all exposed parts of the circuit lie between the resistance and said device, said resistance being of such high magnitude that upon establishment of a closed circuit through said exposed parts and the human body the current in such closed circuit is reduced by said resistance to a safe value; of a casing enclosing said source, cathode ray device, resistance, and conductors, the casing including a movable closure member therefor, a resistor included in series with one of the transformer windings to reduce the magnitude of the normal current in said conductors sufficient to provide a pilot image on the screen of the cathode ray device, and means actuated by said movable closure member when the latter is applied to the casing to close the same for eliminating the effects of said resistor and restore thereby the optimum current flow.

7. The combination with an electrical circuit having a source of dangerously high potential including a transformer with primary and secondary windings, a thermionic asymmetric device operating at a dangerously high potential and optimum anode current, conductors between the secondary of said transformer and the device affording a permanently continuous connection therebetween, and resistance permanently located in series with the secondary of said transformer such that all exposed parts of the circuit lie between the resistance and said device, said resistance being of such high magnitude that upon establishment of a closed circuit through said exposed parts and the human body the current in such closed circuit is reduced by said resistance to a safe value, and a filter condenser in circuit with said conductors, together with resistance permanently located in series therewith such that any exposed parts of a condenser beyond its resistance when contacted by the human body affords a closed circuit having resistance of an order of magnitude, commensurate with the potential at the point of contact, to limit to a safe value the current flow through the included portion of the condenser and the body; of a casing enclosing said source, asymmetric device, condenser, resistances, and conductors, and including a movable closure member, a resistor included in series with the secondary of said transformer and a resistor included in series with the output of the condenser to reduce the magnitude of the anode current flow to the asymmetric device to a sub-normal operative value, and means common to the said resistors actuated by said movable closure member when the latter is applied to the casing to close the same for eliminating the effects of the respective resistors and restore thereby the optimum current flow.

8. The combination with a source of electric current supply of dangerously high potential and optimum current value, a thermionic asymmetric device including a plurality of anodes, and means interposed between said source of current supply and the said asymmetric device, for separating the supply into a plurality of independent sources of dangerous voltage and optimum anode currents and corresponding paths or circuits to the respective anodes, each path including a resistance permanently located in series with the respective sources such that all exposed parts of a path lie between a resistance and the asymmetric device, said resistance being of such high magnitude that upon establishment of a closed circuit through said exposed parts and the human body the current in the particular path contacted is reduced by said resistance therein to a safe value; of a casing enclosing said source, asymmetric device, resistances, and conductors, and including a movable closure member, a resistor included in series with at least one of the circuits to an anode to reduce the magnitude of the anode current flow therein to the asymmetric device to a sub-normal operative value, and means actuated by the said movable closure member when the latter is applied to the casing to close the same for eliminating the effect of said resistor to restore thereby the optimum current flow.

9. The combination with a source of electric current supply of dangerously high potential and optimum current value, a thermionic asymmetric device including a plurality of anodes, and means, interposed between said source of current supply and the said asymmetric device for separating the supply into a plurality of independent sources of dangerous voltage and optimum anode currents and corresponding paths or circuits to the respective anodes, each path including a resistance permanently located in series with the respective sources such that all exposed parts of a path lie between a resistance and the asymmetric device, said resistance being of such high magnitude that upon establishment of a closed circuit through said exposed parts and the human body the current in the particular path contacted is reduced by said resistance therein to a safe value; of a casing enclosing said source, asymmetric device, resistances, and conductors, and including a movable closure member, a resistor included in series with at least one of the circuits to an anode to reduce the magnitude of the anode current flow therein to the asymmetric device to a sub-normal operative value, means to interrupt the remaining anode circuits, and means actuated by said movable closure member when the latter is applied to the casing to close the same for eliminating the effects of said resistor and the said circuit-interrupting means to restore thereby the optimum current flow.

10. The combination with a source of electric current supply of dangerously high potential and optimum current value, a thermionic asymmetric device including a plurality of anodes, and means, interposed between said source of current supply and the said asymmetric device for separating the supply into a plurality of independent sources of dangerous voltage and optimum anode currents and corresponding paths or circuits to the respective anodes, each path including a resistance permanently located in series with the respective sources such that all exposed parts of a path lie between a resistance and the asymmetric device, said resistance being of such high magnitude that upon establishment of a closed circuit through said exposed parts and the human body the current in the particular path contacted is reduced by said resistance therein to a safe value; of a casing enclosing said source, asymmetric device, resistances, and conductors, and including a movable closure member, means to interrupt an anodic circuit, and means actuated by said movable closure member when the latter is applied to the casing to close the same for eliminating the effect of said circuit interrupting means to restore thereby the optimum current flow.

11. The combination with a source of electric current supply of dangerously high potential and optimum current value, a thermionic asymmetric device including a plurality of anodes, and means, interposed between said source of current supply and the said asymmetric device for separating the supply into a plurality of independent sources of dangerous voltage and optimum anode currents and corresponding paths or circuits to the respective anodes, each path including a resistance permanently located in series with the respective sources such that all exposed parts of a path lie between a resistance and the asymmetric device, said resistance being of such high magnitude that upon establishment of a closed circuit through said exposed parts and the human body the current in the particular path contacted is reduced by said resistance therein to a safe value; of a casing enclosing said source, asymmetric device, resistances, and conductors, and including a movable closure member, means to interrupt all but one of the anode circuits, and means actuated by said movable closure member when the latter is applied to the casing to close the same for eliminating the effect of said circuit interrupting means to restore thereby the optimum current flow.

12. In an operating circuit for an asymmetric device of dangerously high potential and optimum operating current and having associated visual indicating means, said device including an anode: means cooperating with said circuit for decreasing the magnitude of the anode current flow to a subnormal value, operative to afford visual indications at said indicating means, but sufficiently diminished to enable contact with exposed parts of the circuit without discomfort, and means to render automatically the said cooperating means ineffective for normal operation of the asymmetric device.

13. The combination with an electrical circuit having a source of dangerously high potential, a thermionic asymmetric device operating at a dangerously high potential and optimum anode current and having associated visual indicating means, conductors connecting the source of high potential with the said device; of a casing enclosing said source, asymmetric device, and conductors, the casing including a movable closure member therefor, and means to decrease the magnitude of the anode current flow to the asymmetric device to a value to afford visual subnormal indications and sufficiently diminished to enable contact with exposed parts of the circuit without discomfort, said means including an element cooperating with the closure member to render said current-decreasing means effective only when the closure member is moved to permit access to the interior of the casing and to render the current-decreasing means ineffective when the closure member is applied to the casing to close the same and thereby restore the optimum current flow simultaneously with closing of the closure member.

14. The method of servicing a thermionic asymmetric device utilizing normally an optimum dangerously high voltage and having associated visual indicating means, which comprises operating the device normally at the dangerous voltage and an optimum anode current, automatically reducing the current prior to and througout the servicing period to a subnormal but safe and operative value sufficient to afford a visual indication, and finally automatically and simultaneously with completion of the servicing restoring the original optimum operating conditions for operation of the device at the normal rated dangerously high voltage and optimum current.

EDWARD G. GAGE.